US009341751B2

(12) United States Patent
Kalyankar et al.

(10) Patent No.: US 9,341,751 B2
(45) Date of Patent: May 17, 2016

(54) ANTIREFLECTIVE COATINGS WITH GRADATION AND METHODS FOR FORMING THE SAME

(71) Applicant: Intermolecular Inc., San Jose, CA (US)

(72) Inventors: Nikhil Kalyankar, Mountain View, CA (US); Richard Blacker, Farmington Hills, MI (US); Minh Huu Le, San Jose, CA (US); Mark Lewis, Ypsilanti, MI (US); Liang Liang, Taylor, MI (US)

(73) Assignee: Intermolecular, Inc., San Jose, CA (US)

( * ) Notice: Subject to any disclaimer, the term of this patent is extended or adjusted under 35 U.S.C. 154(b) by 396 days.

(21) Appl. No.: 13/713,899

(22) Filed: Dec. 13, 2012

(65) Prior Publication Data

US 2014/0170308 A1 Jun. 19, 2014

(51) Int. Cl.
*B05D 5/06* (2006.01)
*G02B 1/115* (2015.01)

(52) U.S. Cl.
CPC ..................................... *G02B 1/115* (2013.01)

(58) Field of Classification Search
CPC .. B05D 5/06; G02B 1/11–1/115; C23C 14/10
USPC ................................................. 427/162–169
See application file for complete search history.

(56) References Cited

U.S. PATENT DOCUMENTS

| | | | | |
|---|---|---|---|---|
| 4,535,026 A * | 8/1985 | Yoldas et al. | ............... | 428/310.5 |
| 4,830,879 A * | 5/1989 | Debsikdar | ............... | B05D 5/061 |
| | | | | 136/256 |
| 5,698,266 A * | 12/1997 | Floch | ...................... | C03C 17/25 |
| | | | | 427/376.2 |
| 5,993,898 A * | 11/1999 | Nagatsuka | ............. | G02B 1/115 |
| | | | | 427/162 |
| 7,128,944 B2 * | 10/2006 | Becker et al. | ................. | 427/162 |
| 7,826,704 B2 | 11/2010 | Chen | | |
| 2007/0207325 A1 | 9/2007 | Brinley | | |
| 2009/0101209 A1 | 4/2009 | Sharma | | |
| 2011/0019277 A1 * | 1/2011 | Sager et al. | ................... | 359/580 |
| 2011/0223329 A1 * | 9/2011 | Meredith | ............. | C03C 17/001 |
| | | | | 427/240 |

FOREIGN PATENT DOCUMENTS

EP 0883824 B1 5/2003

OTHER PUBLICATIONS

Liu, B., et al.; Preparation of Low Refractive Index Fluorinated Materials for Antireflection Coatings; Jun. 3, 2010; National Yunlin University of Science and Technology, Yunlin; Journal of Applied Polymer Science vol. 118 Issue 3 pp. 16151619.

Faustini, M., et al.; Hydrophobic Antireflective SelfCleaning and Antifogging SolGel Coatings an Example of Multifunctional Nanostructured Materials for Photovoltaic Cells; Jul. 15, 2010; Academia—CNRS, France; Chem. Mater. pp. 44064413.

(Continued)

*Primary Examiner* — Elizabeth Burkhart (57) ABSTRACT

Embodiments provided herein describe antireflective coatings and methods for forming antireflective coatings. A substrate is provided. A first antireflective layer is formed over the substrate. The first antireflective layer has a first refractive index. A second antireflective layer is formed on the first antireflective layer. The second antireflective layer has a second refractive index. The first antireflective layer and the second antireflective layer jointly form an antireflective coating. The antireflective coating is graded such that the antireflective coating comprises at least three sub-layers, each of the at least three sub-layers having a unique refractive index.

20 Claims, 10 Drawing Sheets

(56) References Cited

OTHER PUBLICATIONS

Jiang, H., et al.; Variable Refractive Index Polymer Thin Films Prepared by Plasma Copolymerization; Jan. 1, 2004; Z-Book—American Chemical Society; Chem. Mater. pp. 12921297.

Brinley, E., et al.; High Efficiency SiO2TiO2 Hybrid SolGel Antireflective Coating for Infrared Applications; Jan. 1, 2006; American Vacuum Society; J. Vac. Sci. Technol. pp. 11411147.

Xi, J., et al.; Optical ThinFilm Materials With Low Refractive Index for Broadband Elimination of Fresnel Reflection; Mar. 1, 2007; Nature Publishing Group; Nature Photonics vol. 1 pp. 176179.

Chhajed, S., et al.; Nanotructured Multilayer TailoredRefractiveIndex Antireflection Coating for Glass with Broadband and Omnidirectional Characteristics; Jan. 1, 2011; Z—Not Available; Applied Physics Express 3 pages.

Poxson, D., et al.; HighPerformance Antireflection Coatings Utilizing Nanoporous Layers; Jun. 1, 2011; Materials Research Society; MRS Bulletin vol. 36 pp. 434438.

* cited by examiner

ANTIREFLECTIVE COATINGS WITH GRADATION AND METHODS FOR FORMING THE SAME

The present invention relates to antireflective coatings. More particularly, this invention relates to antireflective coatings that have a gradation with respect to refractive index and methods for forming such antireflective coatings.

BACKGROUND OF THE INVENTION

Coatings that provide low reflectivity or a high percent transmission over a broad wavelength range of light are desirable in many applications including semiconductor device manufacturing, solar cell manufacturing, glass manufacturing, and energy cell manufacturing. The transmission of light through a material causes the wavelength of the light to change, a process known as refraction, while the frequency remains unchanged thus changing the speed of light in the material. The refractive index of a material is a measure of the speed of light in that material which is generally expressed as a ratio of the speed of light in vacuum relative to that in the material. Low reflectivity coatings generally have an optimized refractive index (n) in between air (n=1) and glass (n~1.5).

An antireflective (AR) coating is a type of low reflectivity coating applied to the surface of a transparent article to reduce reflectance of visible light from the article and enhance the transmission of such light into or through the article thus decreasing the refractive index.

Antireflective coatings are typically formed using a single layer of antireflective material. However, the theoretical limit for the improvement of optical transmittance for such coatings is ~3.0%.

BRIEF DESCRIPTION OF THE DRAWINGS

Various embodiments of the invention are disclosed in the following detailed description and the accompanying drawings.

DETAILED DESCRIPTION

A detailed description of one or more embodiments is provided below along with accompanying figures. The detailed description is provided in connection with such embodiments, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the embodiments has not been described in detail to avoid unnecessarily obscuring the description.

Embodiments described herein provide antireflective coatings, such as those suitable for use in solar panels, and methods for forming such antireflective coatings on a substrates. The resulting structures (e.g., a transparent substrate and the antireflective coating) demonstrate improved optical transmittance in comparison to antireflective coatings formed using traditional methods (e.g., single layer coatings). In some embodiments, this is accomplished by forming an antireflective coating using wet process (or processing) techniques, which is "graded" with respect to refractive index. That is, the antireflective coating has a lower refractive index on a side thereof opposite the substrate, and the refractive index increases in a series of "steps" or "sub-layers" as the material of the antireflective coating nears the substrate.

In simplified embodiments, the method includes successively forming first and second antireflective layers, with respective first and second refractive indices, on the substrate, and then performing a "grading" process to the coating to enhance the "gradation" of the refractive index (i.e., to cause diffusion between the two antireflective layers). At least one of the antireflective layers is formed using a wet process technique, such as sol-gel. Due to the thickness of the layers (e.g., 30 nm or more), the diffusion only partially penetrates the layers. Thus, the thickness of the sub-layers (e.g., not more than 15 nm) is less than that of the antireflective layers. The grading process may include heating the coating and/or performing a chemical cure on the coating.

In some embodiments, the first and second antireflective layers are formed using a wet process technique, such as a sol-gel system. Prior to forming the second antireflective layer, the solvent present in the first antireflective layer is removed in order to maintain a separation between the first and second antireflective layers.

In other embodiments, the first antireflective layer is formed using a dry process technique, such as physical vapor deposition (PVD), and the second antireflective layer is formed using a wet process technique. Because the first antireflective layer is inherently cured before the forming of the second antireflective layer, separation between the first and second antireflective layers is maintained prior to the grading process.

In some embodiments, the grading process includes a heat treatment (e.g., 500° C. or more). In such embodiments, the substrate may be made of glass that was not previously tempered (in which case, the grading process may also serve to temper the glass). In other embodiments, the grading process includes a chemical cure. In other embodiments, the substrate may be made of glass that was tempered prior to the formation of the antireflective coating.

Figure 1:
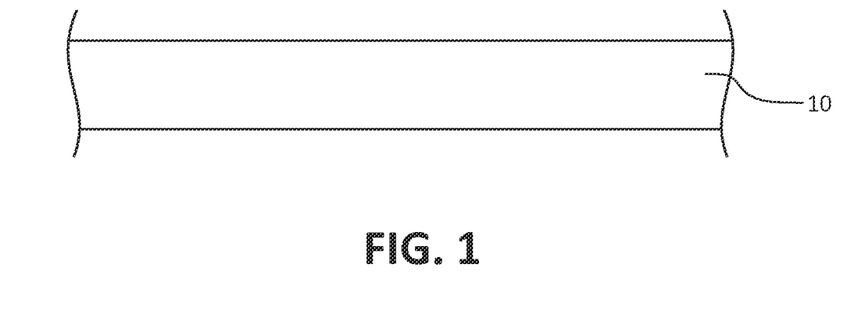
FIGS. 1-4 are cross-sectional views of a substrate illustrating the formation of an antireflective coating thereon, according to some embodiments of the present invention.

FIGS. 1-4 illustrate a method for forming an antireflective (AR) coating according to some embodiments of the present invention. In FIG. 1, a transparent substrate 10 is provided. The transparent substrate 10 may, for example, be made of glass with a refractive index of approximately 1.5 and have a thickness of 0.5 to 2.0 centimeters. As discussed in greater detail below, in some embodiments, the transparent substrate 10 is made of tempered glass, while in other embodiments, the transparent substrate 10 is made of non-tempered glass.

Figure 2:
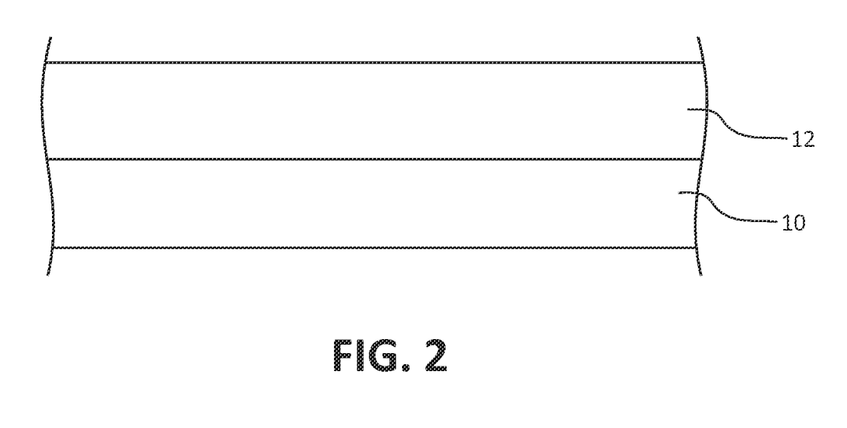

Next, as shown in FIG. 2, a first antireflective layer 12 is formed over the transparent substrate 10. The first antireflective layer 12 may, for example, be silica-based, alumina-based, or titanium-based and have a thickness of at least 30 nm, such as 50 nm. The first antireflective layer 12 has a (first) refractive index of, for example, less than 1.5, such as approximately 1.35.

Figure 3:
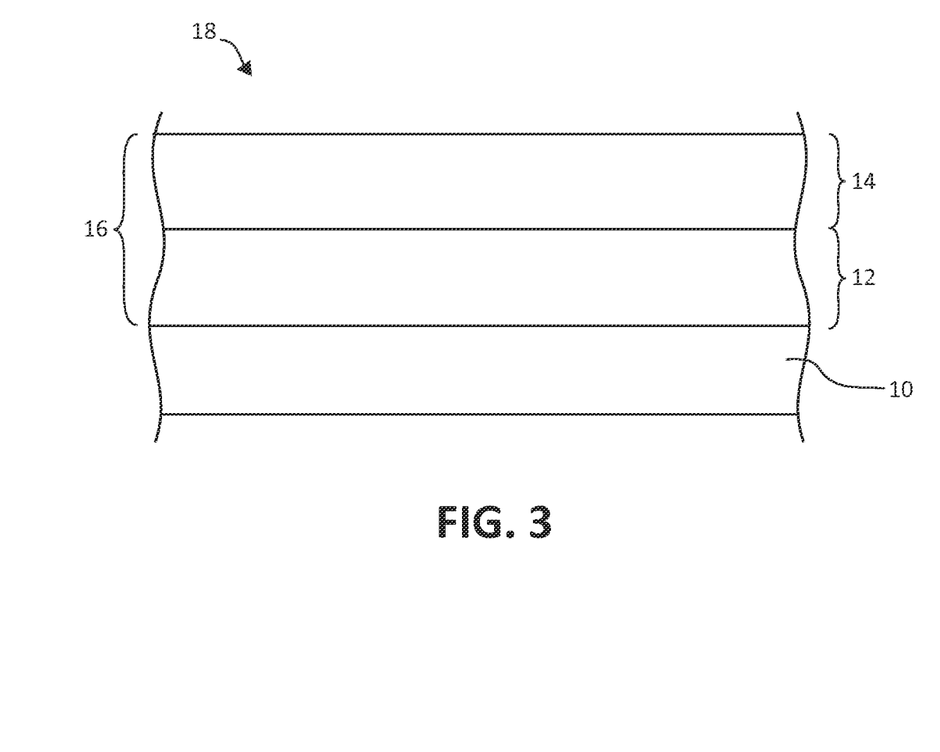

Referring to FIG. 3, a second antireflective layer 14 is then formed over the first antireflective layer 12. Like the first antireflective layer 12, the second antireflective layer 14 may, for example, be silica-based, alumina-based, or titanium-based and have a thickness of at least 30 nm, such as 50 nm. However, the second antireflective layer 14 has a (second) refractive index of, for example, more than 1.0, such as approximately 1.2. It should also be noted that the second antireflective layer 14 is adjacent to (or in contact with) air (e.g., the atmosphere) 16, which has a refractive index of 1.0.

It should be understood that the first antireflective layer 12 and the second antireflective layer 14 may be formed using wet processing techniques, such as sol-gel systems, as described in greater detail below, and dry processing techniques, such as plasma vapor deposition (PVD) or chemical vapor deposition (CVD).

For example, in some embodiments, both the first and second antireflective layers 12 and 14 is formed using wet processing techniques. However, in order to maintain separation between the first and second antireflective layers 12 and 14, solvent in the first antireflective layer 12 (i.e., due to the wet processing technique) is removed from the first antireflective layer 12 before the second antireflective layer 14 is deposited. In other embodiments, the first antireflective layer 12 is formed using a dry processing technique, and the second antireflective layer is formed using a wet processing technique.

Still referring to FIG. 3, the first antireflective layer 12 and the second antireflective layer 14 may be considered to jointly form an antireflective coating 16. The antireflective coating 16 increases in refractive index as the material thereof nears the transparent substrate 10. However, this increase in refractive index occurs in only two "steps," with each step corresponding to one of the antireflective layers 12 and 14.

Figure 4:
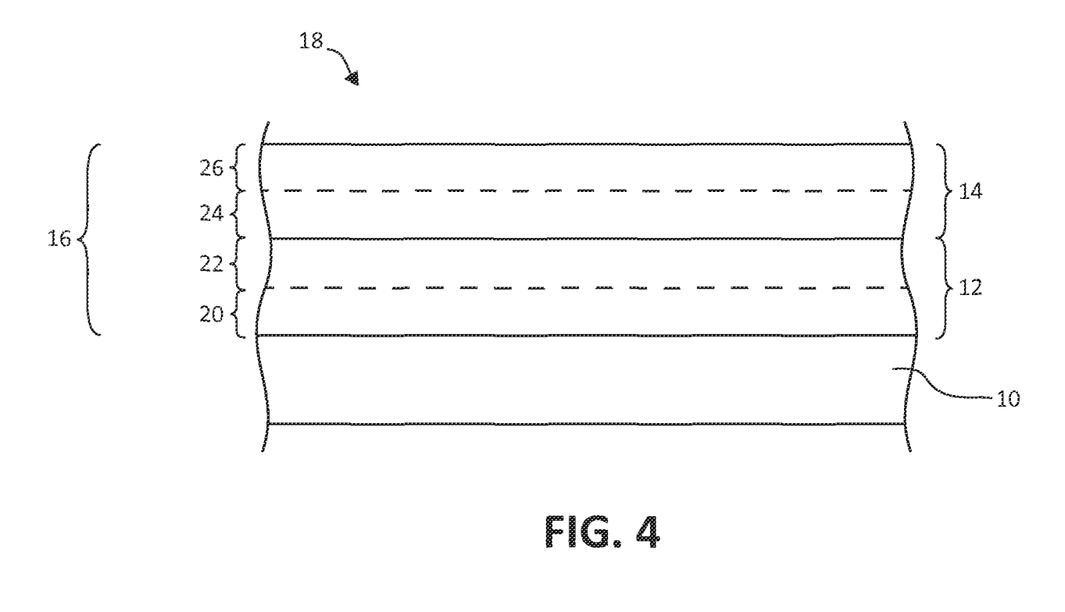

The antireflective coating 16 is then "graded," or undergoes a grading process, causing and/or enhancing diffusion of the material of the second antireflective layer 14 into the material of the first antireflective layer 12. As shown in FIG. 4, the result is that a series of (i.e., at least three) sub-layers 20, 22, 24, and 26 are formed (or manifest) within the antireflective coating 16, each of which has a thickness that is less than the thickness of the first and second antireflective layers 12 and 14. As shown, sub-layers 20 and 22 occupy, or are within, the portion of the antireflective coating 16 previously occupied by the first antireflective layer 12 and sub-layers 24 and 26 occupying the portion of the antireflective coating 16 previously occupied by the second antireflective layer 14. Thus, the number of sub-layers 20-26 is greater than the number of antireflective layers 12 and 14.

Each of the sub-layers 20-26 corresponds to a portion of the antireflective coating 16 with a unique refractive index. As such, after the grading process, the antireflective coating 16 depicted includes four regions/portions with unique refractive indices, as opposed to only two regions with unique refractive indices (i.e., the antireflective layers 12 and 14) prior to the grading process. The respective refractive indices of sub-layers 20-26 may be, for example, approximately 1.35, 1.30, 1.25, and 1.2.

It should be noted that sub-layer 22 is within the first antireflective layer 12 and has a refractive index that is less than the refractive index of the first antireflective layer 12. Similarly, sub-layer 24 is within the second antireflective layer 14 and has a refractive index that is more than the refractive index of the second antireflective layer 14. It should also be noted that the sub-layers 20-26 are arranged such that each of the sub-layers 20-26 has a refractive index that is less that the refractive indices of the sub-layers 20-26 positioned between it and the substrate 10.

Therefore, after the grading process, the refractive index of the antireflective coating 16 changes more gradually (i.e., in a greater number of steps) than before the grading process. However, it should be understood that the example shown in FIGS. 1-4 is merely exemplary as a different number of antireflective layers may be formed over the transparent substrate 10 before the grading process. Additionally, more than two sub-layers may manifest within each of the antireflective layers 12 and 14 to further "smooth" the transition in refractive index.

Thus, in some embodiments, the grading process includes a heat treatment to both the antireflective coating 16 and the transparent substrate 10. In such embodiments, the transparent substrate 10 may be a sheet of glass that is non-tempered prior to the formation of the antireflective layers 12 and 14. The heat treatment may thus be used to temper the glass, as well as to cause the diffusion of the antireflective layers 12 and 14 described above.

In other embodiments, the grading process includes a chemical cure (e.g., exposure to a particular chemical composition(s)). In such embodiments, the transparent substrate 12 may be a sheet of glass that is tempered prior to the formation of the antireflective layers 12 and 14. When utilizing the chemical cure grading process, the porosity of the antireflective layers may be an important parameter, as it may be necessary to allow the chemical composition to seep through the antireflective coating 16 such that the antireflective layers near the transparent substrate 10 are properly exposed. However, it should also be noted that control of the porosity of the antireflective layers may also be used to tune the refractive index of the antireflective layers. Details of the control of the porosity of the antireflective layers are provided below.

Figure 5:
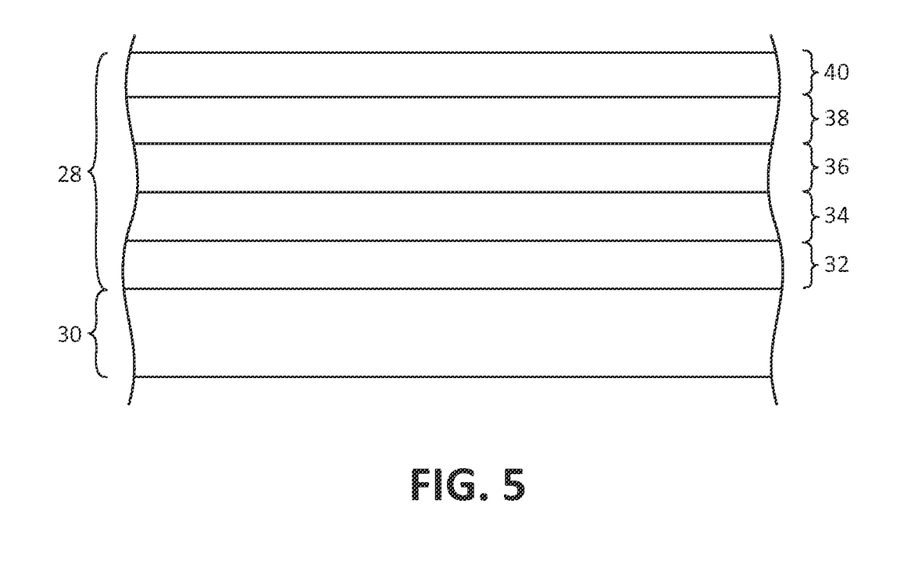
FIGS. 5 and 6 are cross-sectional views of a substrate illustrating the formation of an antireflective coating thereon, according to other embodiments of the present invention.

FIG. 5 illustrates an antireflective coating 28 formed over a transparent substrate 30 before the grading process has been performed, according to other embodiments of the present invention. As shown, the antireflective coating 28 includes five antireflective layers 32-40 which have been successively formed over the substrate 30 in a manner similar to that described above. Each of the antireflective layers 32-40 has a unique refractive index, which increase as the antireflective coating 28 nears the substrate 30. In one example, the refractive indices of the antireflective layers 32-40 are 1.4, 1.35, 1.30, 1.25, and 1.20, respectively.

Figure 6:
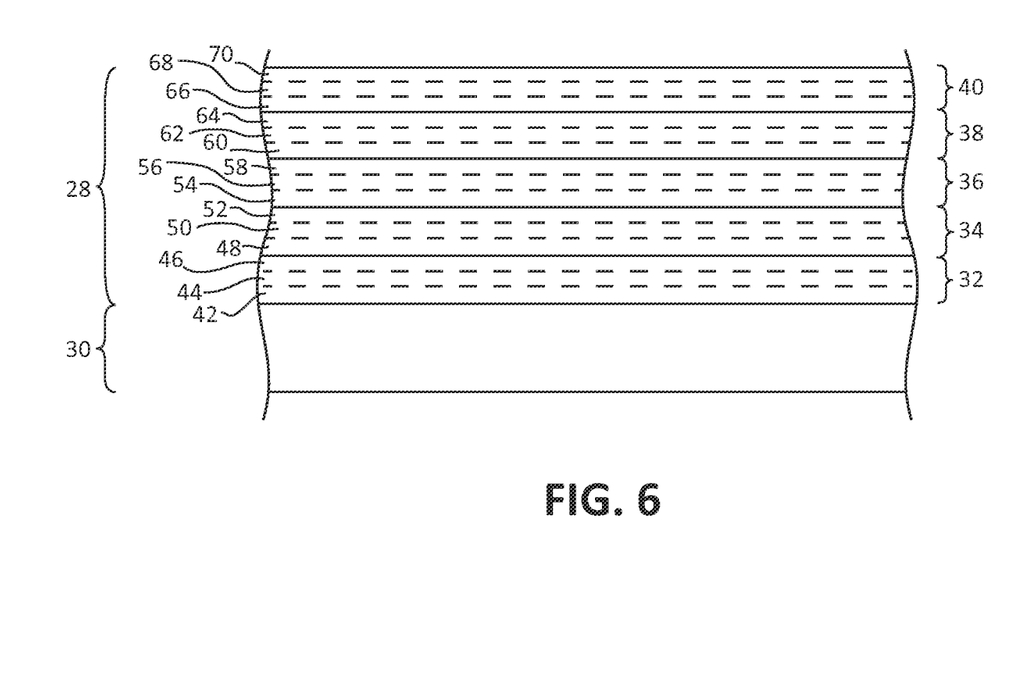

FIG. 6 illustrates the antireflective coating 28 in FIG. 5 after the grading process (e.g., heat treatment or chemical cure) has been performed. As shown, the diffusion of the antireflective layers 32-40 has caused a series (e.g., fifteen) of sub-layers 42-70 to be formed. Similar to the embodiments depicted in FIG. 4, each of the sub-layers 42-70 has a unique refractive index such that the refractive index of the antireflective coating 28 as a whole gradually increases as the antireflective coating 28 nears the transparent substrate 30. More particularly, the grading process has increased the number of "steps" in the change of refractive index of the antireflective coating 28 when compared to the antireflective coating 28 before the grading process.

Figure 7:
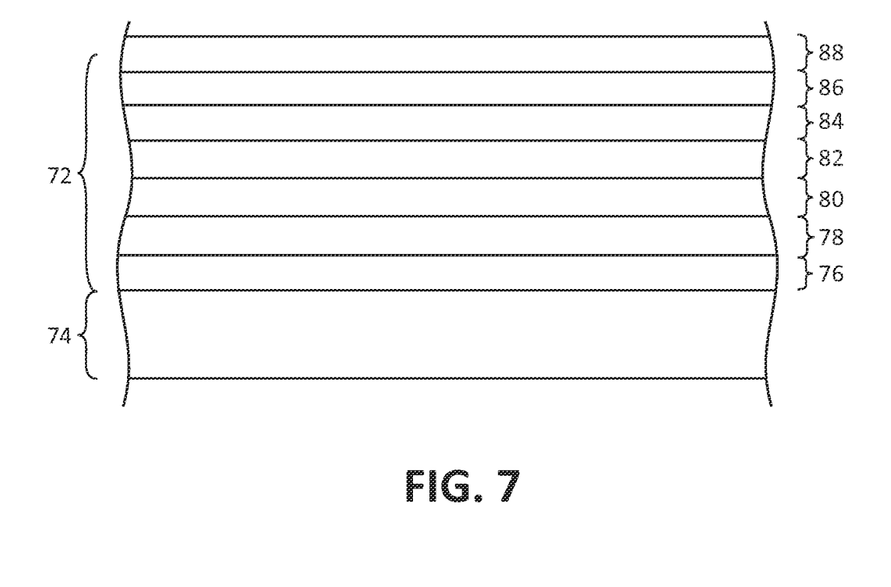
FIG. 7 is a cross-sectional view of a substrate with an antireflective coating formed thereon.

FIG. 7 illustrates an antireflective coating 72 formed over a transparent substrate 74 according to further embodiments of the present invention. As shown, the antireflective coating 74 includes antireflective layers 76-88, which have been formed in succession over the substrate 74 in a manner similar to that described above. Although not shown, each of the antireflective layers 76-88 has a thickness of approximately 41.5 nm. Thus, the total thickness of the antireflective layer is approximately 290 nm.

Figure 8:
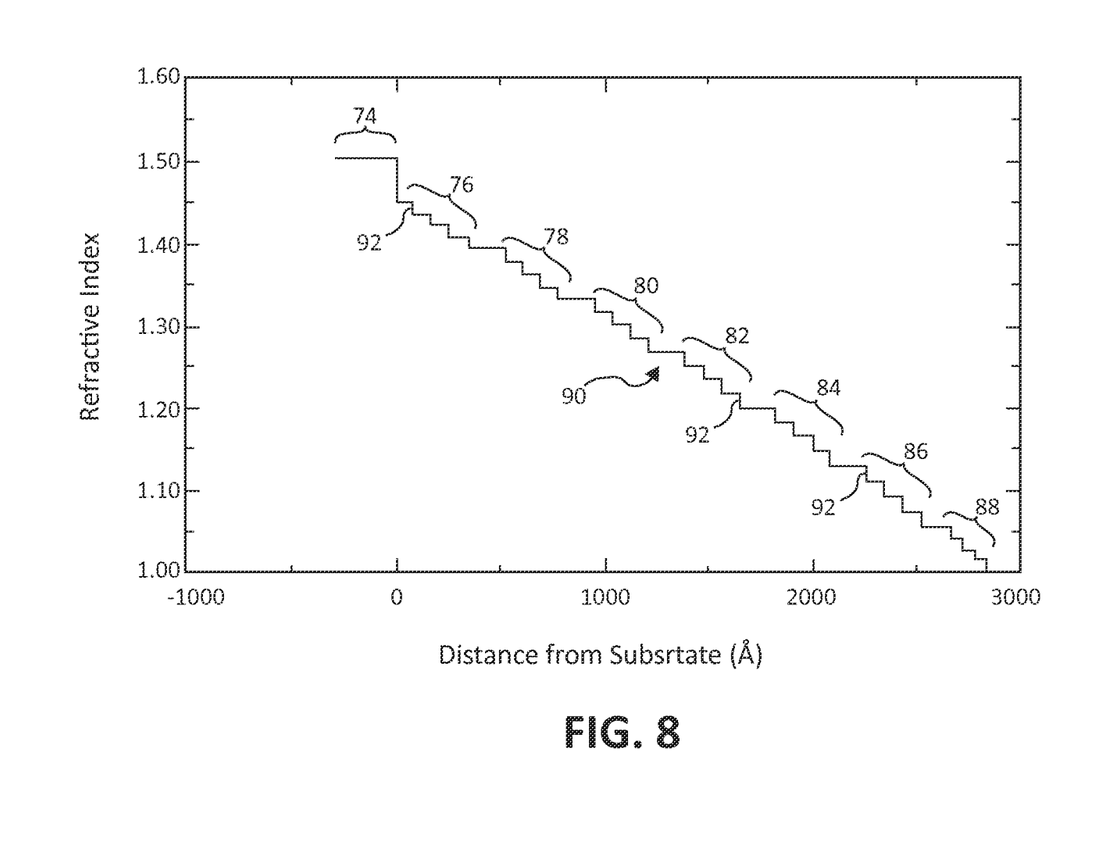
FIG. 8 is a graph illustrating the refractive index profile of the substrate and antireflective coating of FIG. 7.

FIG. 8 graphically illustrates the refractive index profile of the antireflective coating 72 (and the substrate 74) in FIG. 7, after a grading process has been performed. Additionally, the different regions of the profile 90 have been labeled using the same reference numerals used in FIG. 7 to indicate which portions of the profile correspond to the individual layers (i.e., antireflective layers 76-88) in the antireflective coating 72. As shown, the refractive index 90 of the antireflective coating 72 decreases in a series of steps 92 as the distance from the substrate increases. The steps 92 correspond to sub-layers within the antireflective layers 76-88 (FIG. 7) that manifest after the grading process, as described above. In the embodiments shown, four steps 92 have manifested within each of the antireflective layers 76-88 such that there are a total of 28 steps (or sub-layers) 92. In such embodiments, each step (or sub-layer) 92 has a thickness of approximately 10.35 nm (or 103.5 Å).

Again, it should be noted that the number of antireflective layers formed, as well as the thicknesses thereof, may vary in other embodiments. Further, the number (and thickness) of sub-layers that manifest within each of the antireflective layers during the grading may vary. As another example, an antireflective coating may be formed using eight antireflective layers, each having a thickness of approximately 36.5 nm. Such an antireflective coating would also have a total thickness of approximately 290 nm.

Figure 9:
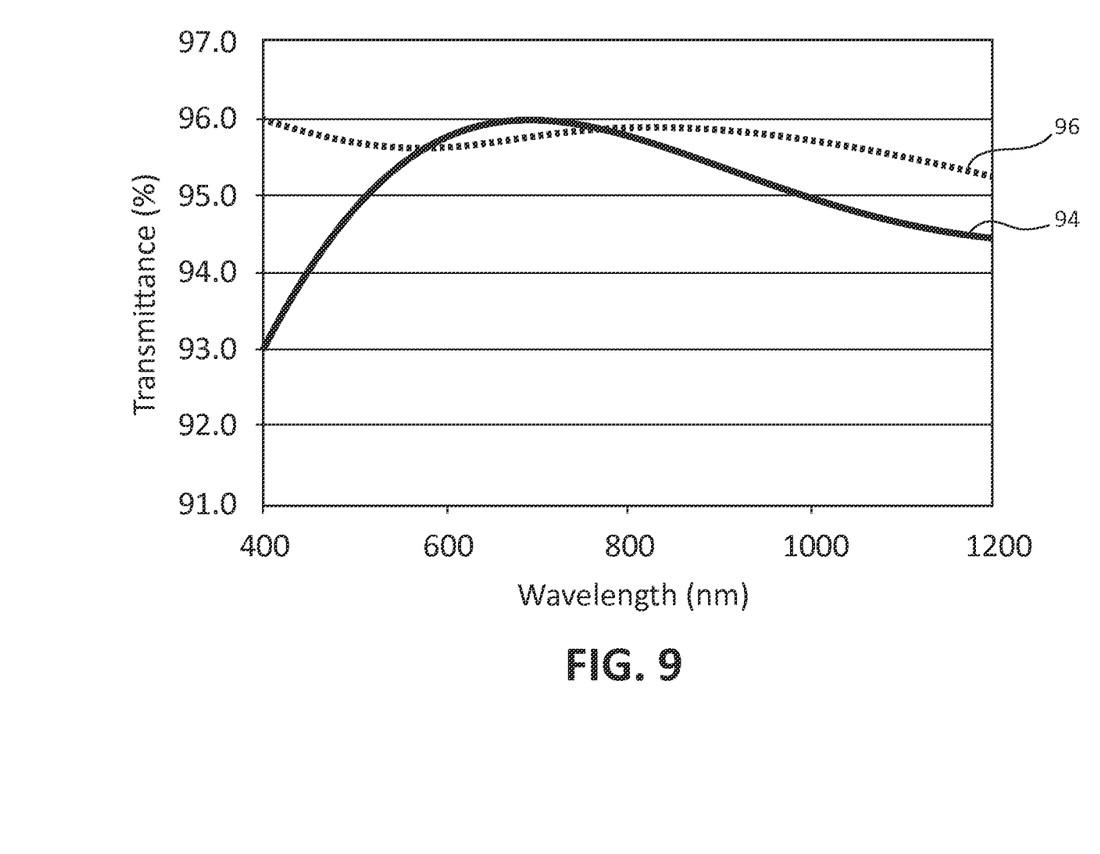
FIG. 9 is a graph illustrating the improvement in optical transmittance demonstrated by an antireflective coating formed in accordance with aspects of the present invention.

FIG. 9 graphically illustrates the improvement in optical transmittance of an antireflective coating formed in accordance with embodiments of the present invention. Line 94 corresponds to the optical transmittance provided by a single, convention antireflective coating with an refractive index of 1.22. As shown, while the optical transmittance of light with a wavelength of approximately 640 nm approaches 96%, at other wavelengths, the transmittance decreases significantly (e.g., below 93% at 400 nm).

Line 96 corresponds to the optical transmittance provided by an antireflective coating formed in a manner similar to that described above. As shown, the optical transmittance is over 95% for the entire spectrum of light with wavelengths between 400 nm and 1200 nm.

As will be appreciated by one skilled in the art, the optical transmittance of the antireflective coating may be further improved by increasing the number and/or decreasing the thickness of the sub-layers. Ideally, the thickness of the sub-layers is decreased to the point that the index profile (such as that shown in FIG. 9) is essentially "smoothed" (e.g., is linear) as opposed to having the "steps" that correspond to individual sub-layers.

In one specific example of an antireflective coating formed in accordance with aspects of the present invention, two antireflective layers are formed on non-tempered glass using wet processing techniques (e.g., dip coating, spray, spin, curtain, roll coating, or a combination thereof).

The first layer includes tetraethylorthosilicate (TEOS) corresponding to 3% total ash content (based on equivalent weight of SiO2 produced) in the final formulation mixed with water (two times the stoichiometric amount based on TEOS), nitric acid (0.02 times the molar TEOS amount) and n-propanol (10-100 times molar TEOS). The solution is stirred for 24 hours at room temperature, or an elevated temperature (e.g., 50-60° C.). The solution is then cooled to room temperature. This formulation by itself generates a single layer antireflective coating with a refractive index ranging from 1.38 to 1.44 using a wet deposition process and heat treatment.

The second layer includes tetraethylorthosilicate (TEOS) corresponding to 3% total ash content (based on equivalent weight of SiO2 produced) in the final formulation mixed with water (two times stoichiometric amount based on TEOS), nitric acid (0.02 times the molar TEOS amount), and n-propanol (10-100 times molar TEOS). The solution is stirred for 24 hours at room temperature, or an elevated temperature (e.g., 50-60° C.). The solution is cooled to room temperature and mixed with an additional amount of n-propanol to bring the total ash content of the solution to ~3%. SILWET® L-77 surfactant is added to this solution at 3% mass level to act as a porogen. This formulation by itself generates a single layer antireflective coating with a refractive index ranging from 1.2 to 1.3 after wet deposition and heat treatment.

On a pre-cleaned glass substrate, the first layer is applied using the aforementioned wet deposition methods. After complete removal of the solvent from the first layer either by room temperature aging (e.g., for 5-60 minutes), or by a heat treatment at temperatures from 50-300° C. for 2 to 30 minutes, the second layer is applied over the first layer by aforementioned wet deposition methods. An optional solvent removal step is used either by room temperature aging (e.g., for 5-60 minutes) or by a heat treatment at temperatures from 50-300° C. for 2 to 30 minutes. The glass substrate is then heat treated (i.e., grading process and glass tempering) to at least 500° C. (e.g., 500-700° C.) for 3 to 10 minutes to prepare a graded antireflective coating. The final thickness of the graded antireflective coating is between 100 nm and 300 nm.

In another specific example of an antireflective coating formed in accordance with aspects of the present invention, three antireflective layers are formed on non-tempered glass using wet processing techniques (e.g., dip coating, spray, spin, curtain, roll coating, or a combination thereof).

The first layer includes tetraethylorthosilicate (TEOS) corresponding to 3% total ash content (based on equivalent weight of SiO2 produced) in the final formulation was mixed with water (10 times stoichiometric amount based on TEOS), hydrochloric acid (0.02 times the molar TEOS amount) and ethanol (10-100 times molar TEOS). The solution is stirred for 24 hours at room temperature or elevated temperature (30-40° C.). The solution is then cooled to room temperature. This formulation by itself generates a single layer antireflective coating having a refractive index ranging from 1.38 to 1.44

The second layer includes n-hexyltriethoxysilane corresponding to 3% total ash content (based on equivalent weight of SiO2 produced) in the final formulation mixed with water (2 times stoichiometric amount based on the silane), acetic acid (0.02 times the molar silane amount), and n-propanol (10-100 times molar silane amount). The solution is stirred for 48 hours at room temperature, or an elevated temperature (e.g., 50-60° C.). SILWET® L-77 surfactant is added to the solution at 0.01% mass level to act as a formulation stabilizer. This formulation by itself generates a single layer antireflective coating having a refractive index ranging from to 1.35 to 1.38.

The third layer includes a sol formulation prepared using 1,2-Ethylenebis (trimethoxysilane) as the alkyltrialkoxysilane-based binder, n-propanol as the solvent, sulfuric acid as the catalyst, a mixture of ORGANOSILICASOL™ IPA-ST-UP elongated and IPA-ST-MS spherical silica particles (50:50 mass ratio), and water. The total ash content of the solution is 4% (based on equivalent weight of SiO2 produced). The ratio of alkyltrialkoxysilane-based binder to silica particles (1,2-Ethylenebis (trimethoxysilane):silica particles) is 25:75 ash content contribution. 1,2-Ethylenebis (trimethoxysilane) and silica particles are mixed with water (10 times the molar 1,2-Ethylenebis (trimethoxysilane) amount), acetic acid (0.05 times the molar 1,2-Ethylenebis (trimethoxysilane) amount), and n-propanol. The solution is stirred for 24 hours at 40° C. and then cooled to room temperature. Additional n-propanol is added to adjust the total ash content of the formulation to 3%. This formulation by itself generates a single layer antireflective coating having a refractive index ranging from to 1.25 to 1.3.

On a pre-cleaned glass substrate, the first layer is applied using the aforementioned wet deposition methods. After complete removal of the solvent from the first layer either by room temperature aging (e.g, for 5-60 min), or by a heat treatment at temperatures between 50-300° C. for 2 to 30 min, the second layer is applied by aforementioned wet deposition methods. After complete removal of solvent from the second layer with a similar method as described for the first layer, the third layer is applied via a similar method. An optional solvent removal step is used either by room temperature aging (e.g., 5-60 minutes), or by a heat treatment at temperatures from 50-300° C. for 2 to 30 min after the third layer. The glass substrate is then heat treated at 500° C. to 700° C. for 3-10 minutes to prepare a graded antireflective coating. The final thickness of the graded antireflective coating ranges from 100 nm to 300 nm.

In a further specific example of an antireflective coating formed in accordance with aspects of the present invention, one antireflective layer is formed using a dry processing technique (e.g., PVD) and two antireflective layers are formed on non-tempered glass using wet processing techniques (e.g., dip coating, spray, spin, curtain, roll coating, or a combination thereof).

The first layer includes porous silica and is deposited using PVD.

The second layer includes tetraethylorthosilicate (TEOS) corresponding to 2% ash content (based on equivalent weight of SiO2 produced) in the final formulation was mixed with water (2 times stoichiometric amount based on TEOS), nitric acid (0.02 times the molar TEOS amount), and n-butanol (10-100 times molar TEOS) and spherical silica nanoparticles (20 to 60 nm particle size) corresponding to 4% ash content. The final total ash content of the formulation is 6%. The solution is stirred for 24 hours at room temperature, or an elevated temperature (e.g., 50-60° Celsius). The solution is cooled to room temperature, and the ash content is adjusted to 1% by addition of the solvent n-butanol. This formulation by itself generates a single layer antireflective coating having a refractive index ranging from 1.32 to 1.35.

The third layer includes cyclohexyltrimethoxysilane corresponding to 4% total ash content (based on equivalent weight of SiO2 produced) in the final formulation mixed with water (5 times stoichiometric amount based on silane), ammonium hydroxide (0.02 times the molar silane amount), and n-butanol (10-100 times molar silane). The solution is stirred for 36 hours at room temperature, or an elevated temperature (50-60° C.). The solution is cooled to room temperature and mixed with an additional amount of n-butanol to bring the total ash content of the solution to ~3%. SILWET® L-77 surfactant is added to this solution at 4% mass level to act as a porogen. This formulation by itself generates a single layer antireflective coating having a refractive index ranging from 1.2 to 1.3.

On a pre-cleaned glass substrate, the first layer of porous silica is deposited using PVD to form a 50 nm thick layer with a refractive index of 1.38 to 1.45. The second and third layers 2 are applied using the aforementioned wet deposition methods. An optional solvent removal step is used either by room temperature aging (e.g., 5-60 minutes), or by a heat treatment at temperatures from 50° C. to 300° C. for 2-30 minutes after each wet deposition step. The glass substrate is then heat treated at 500° C. to 700° C. for 3 to 10 min to prepare a graded antireflective coating. The final thickness of the graded antireflective coating ranges from 100 nm to 300 nm.

Figure 10:
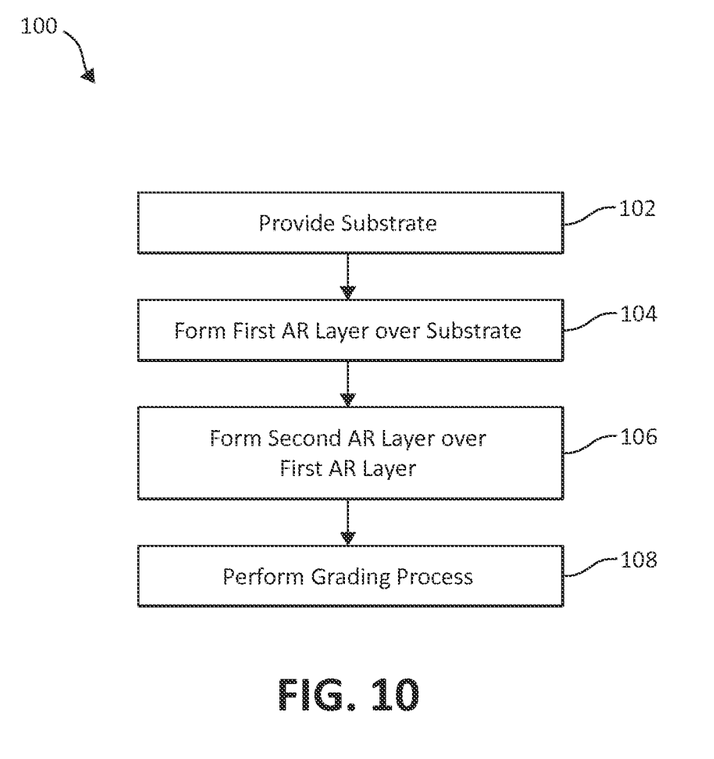
FIG. 10 is a flow chart illustrating a method for forming an antireflective coating, according to some embodiments of the present invention.

FIG. 10 illustrates a method 100 for forming an antireflective coating, according to some embodiments of the present invention. At step 102, a substrate (e.g., a transparent substrate, such as glass) is provided. At step 104, a first antireflective (AR) layer is formed over the substrate. At step 106, a second antireflective layer is formed over the first antireflective layer.

As described above, the first antireflective layer and the second antireflective layer may have different refractive indices and jointly form an antireflective coating. Also, the refractive index of the first antireflective layer is greater than the refractive index of the second antireflective layer.

At step 108, a grading process is performed on the antireflective coating (i.e., the first and second antireflective layers). As described above, the grading process causes a number of sub-layers, greater than the number of antireflective layers, to be formed within the antireflective coating. Each of the sub-layers has a unique refractive index.

In some embodiments, the antireflective layers are formed using sol-gel systems, exemplary details of which are described in greater detail below.

In some embodiments, a wet chemical film deposition process using a specific sol-gel system including at least one self assembling molecular porogen is used to produce porous coatings with a low refractive index (e.g., lower than glass). It has been found by the inventors that the self assembling molecular porogens will self assemble during the coating process, disperse in the gel-phase of the wet film and decompose to form voids upon heating. Use of the self assembling molecular porogens leads to the formation of stable pores with larger volume and an increased reduction in the refractive index of the coating. Further, the size and interconnectivity of the pores may be controlled via selection of the self assembling molecular porogen structure, the total porogen fraction, polarity of the molecule and solvent, and other physiochemical properties of the gel phase.

In addition to the self-assembling molecular porogen, the sol-gel system further includes a film forming precursor which forms the primary structure of the gel and the resulting solid coating. Exemplary film forming precursors include silicon containing precursors and titanium based precursors. The sol-gel system may further include alcohol and water as the solvent system, and either an inorganic or organic acid or base as a catalyst or accelerator. A combination of the aforementioned chemicals leads to formation of sol through hydrolysis and condensation reactions. Various coating techniques, including dip-coating, spin coating, spray coating, roll coating, capillary coating, and curtain coating as examples, may be used to coat thin films of these sols onto a solid substrate (e.g., glass). During the coating process, a substantial amount of solvent evaporates leading to a sol-gel transition with formation of a wet film (e.g., a gel). Around or during the sol-gel transition, the molecular porogens or surfactants self assemble to form nanostructures known as micelles. The deposited wet thin films containing micelles or porogen nanostructures may then be heat treated to remove excess solvent and annealed at an elevated temperature to create a polymerized —Si—O—Si or —Ti—O—Ti— network and remove all excess solvent and reaction products formed by oxidation of the self assembled porogen molecules, thus leaving behind a porous film with a low refractive index, where n is less than 1.3, to ultra low refractive index where n is less than 1.2. Various methods may be used to impart hydrophobicity and dust resistance (self cleaning) to these porous low refractive index films. These methods may further include the use of trisiloxane surfactants as molecular porogens, which is believed to also increase the moisture resistance of the films, application of a hydrophobic self assembled monolayer after AR coating formation, and sealing of the pores using a plasma treatment or molecular masking layer such as a few nanometers thick of a metal oxide layer.

In other embodiments, a specific sol-gel system including at least one porosity forming agent selected from at least one of dendrimers and organic nanocrystals is used to produce porous coatings with a low refractive index (e.g. lower than glass). The at least one porosity forming agent will decompose or combust to form voids of a desired size and shape upon heating. Use of the porosity forming agent leads to the formation of stable pores with larger volume and an increased reduction in the refractive index of the coating. Further, the size and interconnectivity of the pores may be controlled via selection of the porosity forming agent, the total porosity forming agent fraction, polarity of the molecule and solvent, and other physiochemical properties of the gel phase.

In other embodiments, a specific sol-formulation including at least one silane based binder and silica based nanoparticles is used produce porous antireflective coatings with a low refractive index (e.g., lower than glass). Typically, an increase in the binder present in a sol-formulation would lead to a reduction in pore fraction and a corresponding increase in the refractive index of the resulting antireflective coating. However, for the sol-formulations and resulting antireflective coatings described herein, the refractive index unexpectedly decreases between 25% binder ash percent contribution and 70% binder ash percent contribution as a function of increasing binder amount. In addition to the ratio of silane-based binder to silica based nanoparticles, specific combinations of particle size and shape are also believed to contribute to the decrease in refractive index. The resulting porous antireflective coatings may also exhibit high durability and a closed pore structure.

In other embodiments, a specific sol-formulation including at least one silane based binder, silica-based nanoparticles, and an inter-particle interaction modifier is used to produce porous antireflective coatings with a low refractive index (e.g., lower than glass). Typically, silica-based particles are stabilized due to the presence of negative charges on the surface of the silica-based particles that prevents the particles from aggregating. In the absence of any other interaction, the silica-based particles would not aggregate. Only the capillary forces present during solvent drying force the silica-based particles to form aggregates and a network. Use of the inter-particle interaction modifier provides control over this particle aggregation during gelling and solvent drying that eventually leads to gelation. This control creates a more stable particle network that can support capillary forces during solvent drying and minimize network collapse.

In other embodiments, a specific sol-formulation including at least one alkyltrialkoxysilane-based binder and silica based nanoparticles is used to produce porous antireflective coatings with a low refractive index (e.g., lower than glass).

Thus, in some embodiments, a method for forming an antireflective coating on a substrate is provided. A substrate is provided. A first antireflective layer is formed over the substrate using a wet process technique. The first antireflective layer includes a solvent and has a first refractive index and a thickness of at least 30 nm. The solvent is removed from the first antireflective layer. After the removing of the solvent from the first antireflective layer, a second antireflective layer is formed over the first antireflective layer using a wet process technique. The second antireflective layer has a refractive index that is less than the first refractive index and a thickness of at least 30 nm. The first antireflective layer and the second antireflective layer jointly form an antireflective coating. After the forming of the second antireflective layer, a grading process is performed on the antireflective coating. The grading process includes heating the antireflective coating, performing a chemical cure on the antireflective coating, or a combination thereof and causes at least three sub-layers to be formed within the antireflective coating. Each of the at least three sub-layers has a unique refractive index and a thickness that is less than 30 nm. At least one of the at least three sub-layers is within the first antireflective layer and has a refractive index that is less than the first refractive index, and at least one of the at least three sub-layers is within the second antireflective layer and has a refractive index that is more than the second refractive index.

In other embodiments, a method for forming an antireflective coating on a substrate is provided. A substrate having a first refractive index is provided. A first antireflective layer is formed over the substrate with a dry (or wet) process technique. The first antireflective layer has a second refractive index and a thickness of at least 30 nm. The second refractive index is less than the first refractive index. A second antireflective layer is formed over the first antireflective layer with a wet process technique (i.e., after a solvent is removed from the first antireflective layer, if formed using a wet process technique). The second antireflective layer has a third refractive index and a thickness of at least 30 nm. The third refractive index is less than the second refractive index, and the first antireflective layer and the second antireflective layer jointly form an antireflective coating. After the forming of the second antireflective layer, a grading process is performed on the antireflective coating, the grading process includes heating the antireflective coating to at least 500° C., performing a chemical cure on the antireflective coating, or a combination thereof and causes a plurality of sub-layers to be formed within each of the first and second antireflective layers. Each of the plurality of sub-layers has a thickness that is not more than 15 nm and a unique refractive index. The plurality of sub-layers are arranged such that each of plurality of sub-layers has a refractive index that is less than the refractive index of any sub-layers positioned between the substrate and the respective sub-layer.

In further embodiments, a method for forming an antireflective coating on a substrate is provided. A transparent substrate is provided. First and second antireflective layers are successively formed over the substrate. The first antireflective layer has a first refractive index. The second antireflective layer has a second refractive index that is less than the first refractive index. The first and second antireflective layers each have a thickness that of at least 30 nm and jointly form an antireflective coating. At least one of the first and second antireflective layers is formed using a wet process technique. A grading process is performed on the antireflective coating. The grading process includes heating the antireflective coating or performing a chemical cure on the antireflective coating and causes at least three sub-layers to be formed within the antireflective coating. Each of the at least three sub-layers has a unique refractive index and a thickness that is less than 30 nm. At least one of the at least three sub-layers is within the first antireflective layer and has a refractive index that is less than the first refractive index, and at least one of the at least three sub-layers is within the second antireflective layer and has a refractive index that is more than the second refractive index.

Although the foregoing examples have been described in some detail for purposes of clarity of understanding, the invention is not limited to the details provided. There are many alternative ways of implementing the invention. The disclosed examples are illustrative and not restrictive.

What is claimed:

1. A method for forming an antireflective coating on a substrate, the method comprising:
   providing a substrate;
   forming an antireflective coating above the substrate, wherein the antireflective coating consists of a stack of a plurality of uncured antireflective layers, wherein each of the plurality of uncured antireflective layers has a refractive index different than that of the others of the plurality of uncured antireflective layers and a thickness of at least 30 nm; and
   performing a grading process on the antireflective coating, the grading process comprising performing a chemical cure on the antireflective coating and causing at least three sub-layers to be formed within the antireflective coating, each of the at least three sub-layers having a unique refractive index and a thickness that is less than 30 nm.

2. The method of claim 1, wherein the at least three sub-layers are arranged such that each of the sub-layers has a refractive index that is less than the refractive index of any sub-layers positioned between the substrate and the respective sub-layer.

3. The method of claim 2, wherein a first of the plurality of uncured antireflective layers has a first refractive index that is less than 1.5, and a second of the plurality of uncured antireflective layers has a second refractive index that is greater than 1.0.

4. The method of claim 3, wherein each of the plurality of antireflective layers is silica-based, alumina-based, or titanium-based.

5. The method of claim 1, wherein the grading process consists of performing a chemical cure on the antireflective coating.

6. The method of claim 5, wherein the substrate comprises glass, wherein the glass is non-tempered during the formation of the antireflective coating.

7. The method of claim 5, wherein the first of the plurality of uncured antireflective layers is formed using a wet process technique.

8. The method of claim 5, wherein the second of the plurality of uncured antireflective layers is formed using a wet process technique.

9. The method of claim 5, wherein each of the plurality of antireflective layers are formed using a wet process technique.

10. The method of claim 9, wherein the wet process technique comprises dip coating, spray coating, spin coating, curtain coating, roll coating, or a combination thereof.

11. A method for forming an antireflective coating on a substrate, the method comprising:
    providing a substrate having a first refractive index;
    forming an antireflective coating above the substrate, wherein the antireflective coating consists of a stack of a plurality of uncured antireflective layers, wherein each of the plurality of uncured antireflective layers has a refractive index different than that of the others of the plurality of uncured antireflective layers and a thickness of at least 30 nm; and
    performing a grading process on the antireflective coating, the grading process consisting of performing a chemical cure on the antireflective coating and causing a plurality of sub-layers to be formed within each of the plurality of antireflective layers, each of the plurality of sub-layers having a thickness that is not more than 15 nm and a unique refractive index, wherein the plurality of sub-layers are arranged such that each of plurality of sub-layers has a refractive index that is less than the refractive index of any sub-layers positioned between the substrate and the respective sub-layer.

12. The method of claim 11, wherein the substrate comprises glass.

13. The method of claim 12, wherein the glass is tempered before the forming of the antireflective coating.

14. The method of claim 11, wherein a first of the plurality of uncured antireflective layers has a first refractive index that is less than 1.5, and a second of the plurality of uncured antireflective layers has a second refractive index that is greater than 1.0.

15. The method of claim 11, wherein each of the plurality of uncured antireflective layers is formed using a wet process technique.

16. A method for forming an antireflective coating on a substrate comprising:
    providing a transparent substrate;
    forming an antireflective coating above the substrate, wherein the antireflective coating consists of a stack of a plurality of uncured antireflective layers, wherein each of the plurality of uncured antireflective layers has a refractive index different than that of the others of the plurality of uncured antireflective layers, is formed using a wet process technique, and has a thickness of at least 30 nm; and
    performing a grading process on the antireflective coating, the grading process consisting of performing a chemical cure on the antireflective coating and causing a plurality of sub-layers to be formed within each of the plurality of antireflective layers, each of the plurality of antireflective layers sub-layers having a unique refractive index and a thickness that is less than 30 nm, wherein the plurality of sub-layers are arranged such that each of plurality of sub-layers has a refractive index that is less than the refractive index of any sub-layers positioned between the substrate and the respective sub-layer.

17. The method of claim 16, wherein the wet process technique comprises dip coating, spray coating, spin coating, curtain coating, roll coating, or a combination thereof.

18. The method of claim 17, wherein the transparent substrate comprises glass.

19. The method of claim 18, wherein the glass is tempered before the forming of the antireflective coating.

20. The method of claim 19, wherein each of the plurality of antireflective layers is silica-based, alumina-based, or titanium-based.

* * * * *